Oct. 31, 1933.   F. L. SCOTT   1,932,487
COMBINATION SCRAPING AND ROLLING CUTTER DRILL
Filed July 11, 1930
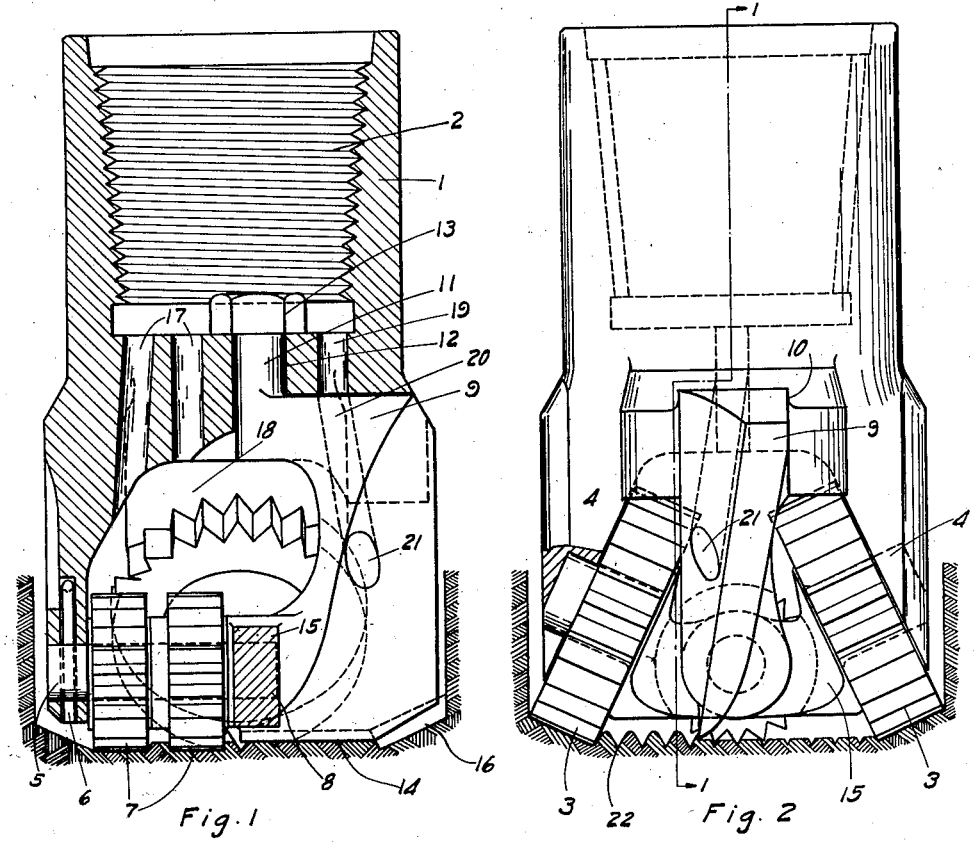
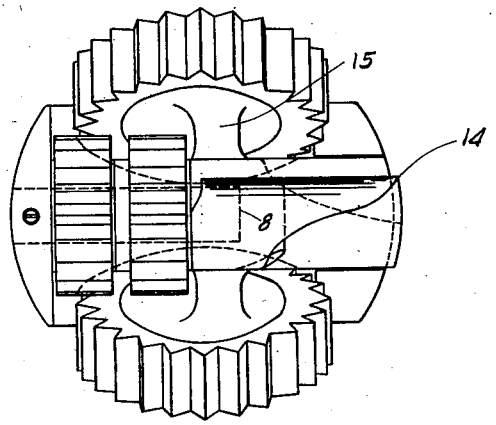
Fig. 3
Floyd L. Scott  Inventor
By  Jesse R. Stone
Attorney Patented Oct. 31, 1933

1,932,487

UNITED STATES PATENT OFFICE 1,932,487

COMBINATION SCRAPING AND ROLLING CUTTER DRILL

Floyd L. Scott, Houston, Tex., assignor to Hughes Tool Company, Houston, Tex., a corporation of Texas Application July 11, 1930. Serial No. 467,170

9 Claims. (Cl. 255—61)

My invention relates to earth boring drills such as are employed in deep well drilling of oil, water, gas and the like.

In the drilling of deep wells with drill bits having rolling cutters thereon difficulty is experienced in some formations in making progress with the rolling cutters. It is found that where the formations are sticky and plastic, the cutters will roll in the mass of material without doing more than making tracks and impressions in the material at the bottom of the hole without disintegrating the same.

It is an object of my invention to provide a roller boring drill having in combination therewith means to cut away the material extruded upwardly between the teeth of the rolling cutters, so that the flushing fluid may engage the same and carry it away to the surface.

I desire to so mount the scraping cutter that it will cut off the crests of the "gear teeth" formed by the cutters on the bottom of the hole.

Referring to the drawing herewith Fig. 1 is a central vertical section through a drill embodying my invention, said section being taken on the plane 1—1 of Fig. 2. Fig. 2 is a side elevation of the drill taken from the right of Fig. 1. Fig. 3 is a bottom plan view of the drill.

In illustrating my invention I have shown the same as employed upon a drill of the cross roller type. There is a head 1, having a threaded socket at the upper end to be engaged with the drill collar or the drill stem. On the lower end of the head are mounted two opposite inclined cutters 3. These cutters are disc shaped, and they are set in position with the upper sides inclined toward each other, and are rotatable upon pins shown in dotted lines at 4. The shafts 4 are formed as extensions upon lateral bosses 15 formed upon the opposite sides of the blade 9. The lower end of the head 1 of the drill is slotted upwardly to receive the said shafts 4 when the cutters are assembled in the head, and it will be seen that the assembly may be mounted as a unit.

Between the two inclined side cutters I have shown a shaft 5 mounted in the lower end of the head and held non-rotatably in position by means of a pin 6. This shaft serves as a support for a plurality of rotatable disc shaped cutters 7 of materially smaller diameter than are the side cutters 3.

The inner end of the shaft 5 is supported in a socket 8 formed in a scraping cutter 9. Said scraping cutter is formed somewhat like the usual fish tail bit. It is fitted within a recess formed radially in the head, said recess extending inwardly to a point adjacent the axis of the drill. The inner side of said blade has an upwardly extending post or shank 11 which fits within an opening 12 in the head and extends into the lower end of the socket 2 thereof. A nut 13 on said post is employed to retain the cutter blade firmly in position.

A forward side of the blade is beveled rearwardly and outwardly and has an outer cutting edge indicated at 14 in Fig. 3. The blade tapers in thickness downwardly toward the cutting edge 14 on the outer side, the inner side of the blade being of approximately uniform thickness and provided with the socket 8, previously referred to, in which is received the cutter shaft 5. The blade thus forms a support for the shaft of the two rolling cutters 7, and the lower cutting edge 14 cuts the bottom of the hole on one-half of the bit, while the two rolling cutters 7 cut the opposite portion. The two side cutters 13 cut the outer margin of the hole to maintain clearance for the head of the bit. The portion of the bottom cut by these cutters is shown at 16 in Fig. 1. The head of the drill is formed with channels 17 directed downwardly into the recess 18 in which the cutters are mounted. There is also a channel 19 extending through the head and communicating with a similar channel 20 in the blade. This channel is inclined forwardly and issues at 21 on the forward side of the blade about midway its ends.

In the use of this drill, the cutting roller 7 rolling upon the material at the bottom of the hole will make indentations therein with ridges 22 between them. This will be seen particularly in Fig. 2. The cutting blade 9 extends downwardly to a level approximately even with the lower side of the rolling cutters 7, and will therefore cut off the upper portion of the ridges 22, so that the same may be engaged by the flushing fluid and carried away. In this manner, the action of the drill in sticky formations is much more efficient than where the rolling cutters alone are employed. The rolling cutters act to dig into the bottom of the hole, forcing ridges of material upwardly along the bottom similar to gear teeth, and this material is then sheared away from the bottom of the hole by the cutting edge of the blade 9. This combination is therefore particularly effective and makes it possible to drill soft formations as well as hard formations with this type of roller drill.

What I claim as new is:

1. A well drill including a head, a scraping blade extending radially of the forward end thereof, inclined side cutter shafts extending from each side of said blade and rolling cutters thereon.

2. A well drill including a head, a blade extending forwardly from said head, an upwardly extending post on said blade, means to engage said post and fix it rigidly in said head, cutter shafts supported by said blade and rolling cutters on said shafts.

3. A well drill including a head, a blade extending forwardly from said head, a post on said blade, means to engage said post and fix it rigidly in said head, inclined side cutter shafts on said blade, side cutters on said shafts, said side cutters and said blade being adapted to be inserted into position in said head as a unit.

4. A cross roller well drill including a head, a pair of oppositely disposed inclined side cutters at the forward end of said head, a plurality of cross roller cutters between said side cutters at one side of the center at said forward end, and a downwardly extending scraping blade at one side of and aligned with said roller cutters between said side cutters.

5. A well drill including a head, a pair of inclined side cutters at the forward end thereof, a scraping blade fixed in said head between said side cutters and extending from the center to one side of said head, a shaft aligned in the same vertical plane with said blade and supported at one end therein, and a rolling cutter on said shaft positioned to cut the well bottom approximately in the same plane as said blade.

6. A well drill including a head, a pair of inclined side cutters at the forward end thereof, a scraping blade fixed in said head between said side cutters, means on said blade to support said cutters, a horizontal shaft aligned in the same vertical plane with said blade and supported at one end therein, and a rolling cutter on said shaft positioned to cut the well bottom approximately in the same plane as said blade.

7. A well drill including a head, a pair of inclined side cutters at the forward end thereof, cross roller cutters positioned to cut the well bottom on approximately the same plane as said side cutters, and a scraping blade fixed radially between said side cutters, and adapted to scrape the material from the well bottom after it is dug up by said cross roller cutters.

8. A well drill including a head, a cutting blade secured in said head and extending radially across the forward end at one side thereof, a shaft supported in said blade at the central axis of the drill, a leg on said head supporting the other end of said shaft, a plurality of roller cutters on said shaft and acting to cut the bottom of the hole, and a plurality of inclined cutters mounted in said head to cut clearance at the side wall of the hole.

9. A well drill including a head, a blade extending forwardly from said head at one side of the central axis of said head, a post on said blade removably mounted in said head, a shaft supported at one end in said blade, rolling cutters on said shaft, and an outer support for said shaft in said head, both said blade and said rolling cutters acting to cut the bottom of the hole.

FLOYD L. SCOTT.